(12) United States Patent
Nuesch et al.

(10) Patent No.: US 11,173,485 B2
(45) Date of Patent: Nov. 16, 2021

(54) PIPETTING SYSTEM

(71) Applicant: TECAN TRADING AG, Mannedorf (CH)

(72) Inventors: Basil Nuesch, Uetikon am See (CH); Nicolas Cors, Rapperswil (CH)

(73) Assignee: TECAN TRADING AG, Mannedorf (CH)

( * ) Notice: Subject to any disclaimer, the term of this patent is extended or adjusted under 35 U.S.C. 154(b) by 335 days.

(21) Appl. No.: 16/373,128

(22) Filed: Apr. 2, 2019

(65) Prior Publication Data

US 2019/0308186 A1   Oct. 10, 2019

(30) Foreign Application Priority Data

Apr. 6, 2018   (EP) ..................... 18166132

(51) Int. Cl.
| | |
|---|---|
| *B01L 3/02* | (2006.01) |
| *B25J 15/04* | (2006.01) |
| *B25J 15/02* | (2006.01) |
| *G01N 35/10* | (2006.01) |
| *B01L 9/00* | (2006.01) |
| *B25J 15/06* | (2006.01) |
| *B25J 15/00* | (2006.01) |

(52) U.S. Cl.
CPC ............. *B01L 3/021* (2013.01); *B01L 3/0275* (2013.01); *B25J 15/0014* (2013.01); *B25J 15/0253* (2013.01); *B25J 15/0408* (2013.01); *B25J 15/0608* (2013.01); *G01N 35/1065* (2013.01); *B01L 2200/025* (2013.01); *G01N 2035/1051* (2013.01); *G01N 2035/1069* (2013.01)

(58) Field of Classification Search
None
See application file for complete search history.

(56) References Cited

U.S. PATENT DOCUMENTS

| | | | |
|---|---|---|---|
| 7,081,228 B1 * | 7/2006 | Ito ...................... | B01L 3/0275 422/525 |
| 2011/0300033 A1 * | 12/2011 | Battisti ................. | B05B 11/048 422/501 |
| 2015/0239129 A1 * | 8/2015 | Buchloh ............... | B25J 15/0608 294/81.6 |

* cited by examiner

*Primary Examiner* — Matthew D Krcha
*Assistant Examiner* — Brittany I Fisher
(74) *Attorney, Agent, or Firm* — Notaro, Michalos & Zaccaria P.C.

(57) ABSTRACT

A pipetting system having at least one pipette tip receptacle with a pipette tip arranged therein that extends along a vertical axis and at least one gripper having a mechanical coupling, the gripper is coupled to the at least one pipette tip receptacle with the coupling and at least one grip element. The at least one grip element has at least one substantially vertical portion and at least one substantially horizontal portion and the coupling has a body having a through channel that extends along the vertical axis over the entire length of the coupling and the pipette tip extends along the through channel of the coupling.

20 Claims, 7 Drawing Sheets

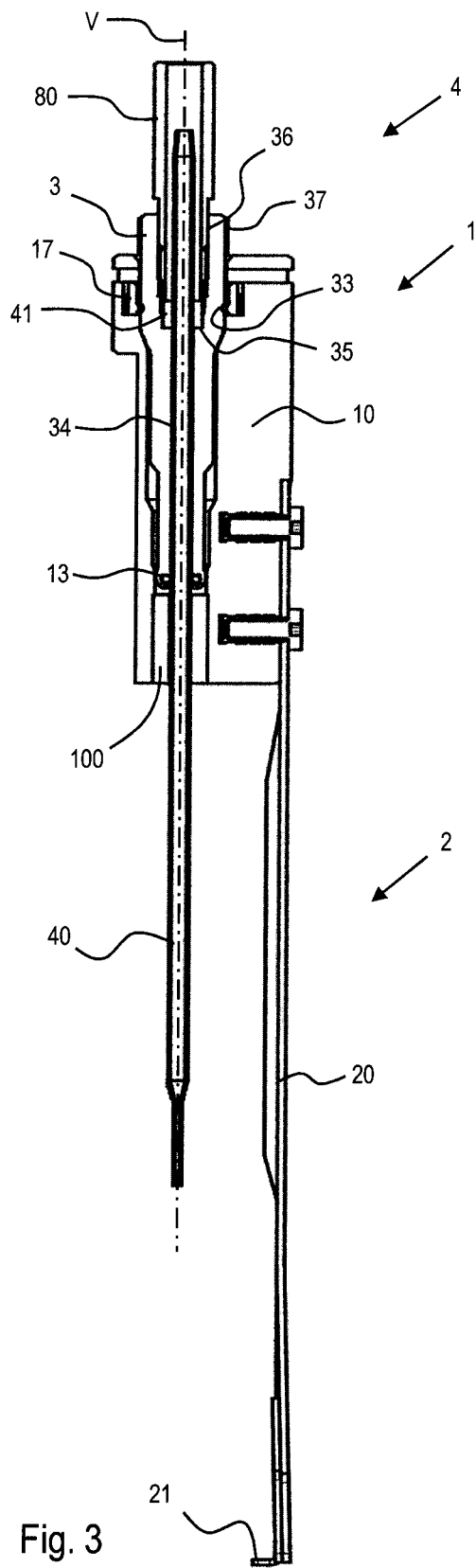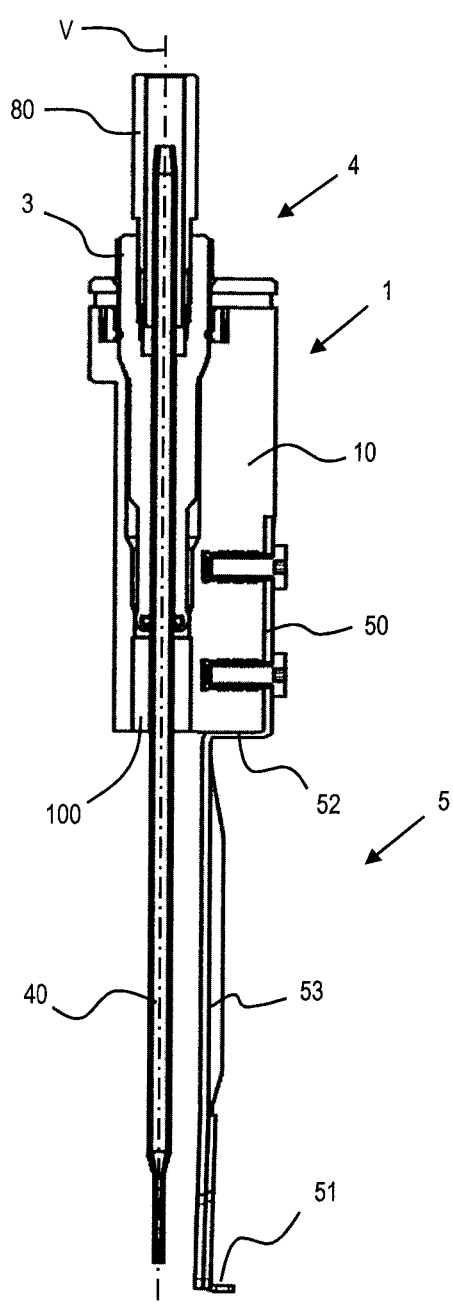
Fig. 3
Fig. 4

PIPETTING SYSTEM

TECHNICAL FIELD

The present invention relates to a pipetting system, in particular with grippers for microplates, deep well plates, sample tubes and other laboratory articles.

PRIOR ART

Pipetting systems are known in which instead of disposable pipette tips, grippers or other tools can be received with pipette tip receptacles. Normally so-called disposable tips (DiTi) are received with pipette tip receptacles of such systems and discarded again after pipetting. Only one disposable tip or one gripper can be fastened on the pipette tip receptacle. Since the use of disposable tips in continuous operation is expensive and costs are additionally incurred for their disposal, frequently fixedly mounted pipette tips made of steel are used. However, a pipetting system with fixedly mounted pipette tips is not capable of receiving conventional grippers or other tools with pipette tip receptacles.

DESCRIPTION OF THE INVENTION

An object of the present invention consists in providing a pipetting system in which a gripper can be used together with an inserted pipette tip.

This object is solved by a pipetting system having the features of claim 1. Further embodiments of the pipetting system are defined by the features of further claims.

A pipetting system according to the invention comprises at least one pipette tip receptacle with a pipette tip arranged therein, which extends along a vertical axis, at least one gripper comprising a mechanical coupling which extends along the vertical axis, wherein the gripper with the coupling is coupled to at least one pipette tip receptacle and at least one grip element which extends from the coupling along the vertical axis, wherein the at least one grip element comprises at least one substantially vertical portion, wherein the coupling comprises a body having a through channel which extends along the vertical axis over the entire length of the coupling and wherein the pipette tip extends at least partially along the through channel of the coupling. Such a configuration has the advantage that the pipette tip need not be removed to mount the gripper. Accordingly, no disposable tips need to be used and disposed of, with the result that costs are reduced. In addition, no additional holders are required for pipette tip, with the result that the space that the holders would need can be used otherwise.

In one embodiment, the grip element is arranged laterally on the body of the coupling. This allows a simple and cost-effective mounting.

In one embodiment, at the upper free end of the coupling a first force disk is arranged clampably between the body and an axial guide ring, wherein the inner contour of the first force disk in the clamped state projects into the interior of the contour of the through channel. Due to the force disk a centring and a clamping can be achieved at the same time.

In one embodiment, the pipette tip receptacle comprises an adapter with a through channel, which extends along the vertical axis over the entire length of the adapter, wherein the pipette tip extends at least partially along the through channel of the adapter. The adapter ensures that the pipette tip is positioned and fixed exactly and securely and enables an exact and secure positioning and fixing of the gripper on the pipette tip receptacle.

In one embodiment, the pipette tip extends through the through channel of the adapter and beyond the adapter. The adapter can be configured to be shorter, the same length or longer than the coupling of the gripper.

In one embodiment, the through channel of the adapter comprises a first portion with a thread having a first diameter, wherein the first portion extends from an upper front side of the adapter along the vertical axis downwards. The adapter comprises a second portion adjoining the first portion having a second diameter, wherein the second diameter is configured to be smaller than the first diameter. The adapter comprises a third portion adjoining the second portion having a third diameter, wherein the third diameter is smaller than the second diameter, whereby a circumferential shoulder is obtained on which the pipette tip is arranged. The pipette tip comprises a circumferential collar which abuts the circumferential shoulder. The collar of the pipette tip is clamped between the circumferential shoulder and a pipetting tube of a Z axis of a manipulator.

In one embodiment, at the upper free end of the adapter on the outer side an entrainment profile is formed. The entrainment profile can comprise one or more recesses on the circumference of the adapter. For example, it can be configured to be ribbed so that the adapter can easily be screwed tight by hand on the pipetting tube. Alternatively, the entrainment profile can comprise one or more recesses for engagement with a tool, for example, with a key.

In one embodiment, the adapter comprises a shaft having a cylindrical first portion, a conical second portion and a cylindrical third portion. The through channel of the coupling comprises corresponding portions which are substantially congruent to the respective portions of the adapter or which form identically shaped counter-pieces to the respective portions of the adapter.

In one embodiment, in the first portion of the adapter a circumferential first elevation is provided, the outer contour of which projects outwards over the contour of the first portion, wherein the outer contour of the first elevation lies inside the contour of the through channel of the coupling. The circumferential elevation brings about an increased holding force together with the first force disk and centres the adapter in the through channel of the coupling.

In one embodiment, in the first portion of the adapter a radially outwardly extending second elevation is provided, wherein at the upper free end of the coupling at least one second recess is provided, which extends radially outwards from the through channel and wherein the second elevation of the adapter can be received in the second recess of the coupling, with the result that a relative twisting of the gripper relative to the adapter can be prevented. For example, several elevations can be provided, which can engage in corresponding recesses. The elevations on the adapter and the corresponding recesses on the coupling can be configured to taper conically downwards along the vertical axis to facilitate insertion and alignment.

In one embodiment, in the through channel of the adapter in the region of the lower free end of the adapter a first seal is provided, which prevents any direct contact of the pipette tip with the through channel of the adapter. In one embodiment, in the third portion of the adapter on the outer side thereof, an annular second seal is arranged, the outer contour of which projects beyond the outer contour of the third portion of the adapter. In one embodiment, in the first portion of the adapter on the outer side thereof, a third seal is arranged, the outer contour of which projects beyond the outer contour of the first portion of the adapter. For example, the first, the second and the third seal are O rings which ensure a resilient and sealing centring of the pipette tip in the adapter.

In one embodiment, in the first portion of the adapter on the outer side thereof a circumferential groove is provided. In a first portion of the through channel a circumferential fourth groove is provided. An annular elastic coupling element is provided, which engages in both grooves. For example, the coupling element is a toroidal spring. The coupling element can comprise a seal, for example, in the form of an at least partial plastic sheathing. The coupling element can also be completely surrounded by plastic. Alternatively, the coupling element can be a clamping ring or a clamping sleeve.

In one embodiment, in the coupling at least one radial bore is provided, which extends radially outwards from the fourth groove and in which a pusher is arranged, by means of which a radially inwardly directed force can be applied to the coupling element. With several pushers an external application of force on the coupling element which is distributed more uniformly on the circumference can be achieved. In addition, the total force is increased. Thus, a precise setting of the force can be made which is required for the arrangement of the gripper on the pipetting tube.

In one embodiment, in the third portion of the through channel a circumferential second groove is provided in which an annular second seal is arranged, the inner contour of which projects into the interior of the contour of the third portion of the through channel. For example, an O ring or a lip seal is provided. The second seal also centres and seals.

In one embodiment, in the first portion of the through channel a circumferential third groove is provided, in which an annular third seal or in which an annular third seal and a second force disk are arranged, wherein the inner contour of the third seal projects into the interior of the contour of the first portion of the through channel. The third seal can also be an O ring or a lip seal. The second force disk can be made of plastic or of metal. With the force disk a radially inwardly directed force can be exerted on the third seal. This design reduces the stiffness behaviour of the third seal when force is applied to the inner side of the third seal since the force disk is more resilient compared to the gripper material in the region of the coupling.

In one embodiment, the body of the coupling comprises a holding device with a recess arranged laterally to the through channel. With the holding device the coupling can be arranged on a holder provided for this purpose. For example, several grippers can be arranged on a holder. The recess forms a positive connection to the holder. The recess can comprise position bores wherein these can be arranged distributed regularly over the recess. For example, four position bores can be arranged in a rectangle.

In one embodiment, the body of the coupling comprises magnet bores which extend substantially perpendicular to the recess and in which magnets are arranged at a distance from the recess. For example, the magnet bores are arranged on the opposite side of the holding device and end at a distance from the recess of the holding device. The magnets can be cylindrical permanent magnets which are let into the magnet bores. The holder can comprise a magnetic element with the result that an additional holding force is obtained together with the magnets of the coupling.

In one embodiment, the at least one grip element comprises at least one substantially horizontal portion. This portion can be configured to be one-part or multi-part. For example, the at least one horizontal portion can comprise one, two or more horizontal tabs which are formed in one piece with the vertical portion or which are arranged on it.

In one embodiment, the substantially horizontal portion of the grip element extends away from the pipette tip. As a result of this arrangement, the pipette tip is separated from the laboratory article to be gripped by at least one vertical portion and protected accordingly. Alternatively, the horizontal portion can be directed towards the pipette tip.

In one embodiment, the at least one grip element comprises at least one further substantially vertical portion.

In one embodiment, a damping element is arranged on the vertical portion or on the further vertical portion. The damping element can, for example, be a rubber or foam element; for example, in mat or plate form. The damping element not only damps, it also increases the adhesion of the grip element.

In one embodiment, the at least one grip element comprises further portions which are arranged between the vertical portion and the horizontal portion or which are arranged between the vertical portion and the further vertical portion. The further portions can be configured horizontally, vertically, angularly or curved. Angular portions are aligned obliquely, i.e. at an angle which is neither horizontal nor vertical.

In one embodiment, at least one of the further portions comprises a through opening which is arranged in the extension of the through channel. The through opening is arranged in the extension of the through channel of the coupling and the adapter. The pipette tip used can be inserted unhindered into the through opening.

In one embodiment, two, more, or all the portions comprise a separate through opening or wherein two, more, or all the portions comprise a common through opening.

In one embodiment, the pipetting system further comprises a manipulator, by means of which the at least one pipette tip receptacle can be moved along a first horizontal axis, along a second horizontal axis perpendicular to the first horizontal axis and along a vertical axis perpendicular to the two horizontal axes.

In one embodiment, the pipetting system further comprises at least one holder for the at least one gripper. The at least one holder can be arranged on a work table of the system. Several holders can be arranged next to one another on the work table. The holders can be made of a magnetic or magnetizable material or can comprise such a material.

The mentioned embodiments of the pipetting system can be used in any combination provided they do not contradict one another.

A method according to the invention for use of a gripper in a pipetting system according to one of the preceding embodiments comprises the steps:
  providing at least one pipette tip receptacle with a pipette tip arranged therein;
  providing at least one gripper with a through channel;
  arranging the pipette tip receptacle over the gripper;
  lowering the pipette tip receptacle with the result that the pipette tip is introduced into the through channel; and
  producing a connection between the pipette tip receptacle and the gripper.

BRIEF DESCRIPTION OF THE FIGURES

Exemplary embodiments of the present invention are explained in further detail hereinafter with references to the figures. These merely serve for explanation and should not be interpreted as restrictive. In the figures

FIG. 3 shows a sectional view of a further embodiment of a gripper according to the invention;

FIG. 4 shows a sectional view of a further embodiment of a gripper according to the invention;

DETAILED DESCRIPTION OF THE INVENTION

Figure 1:
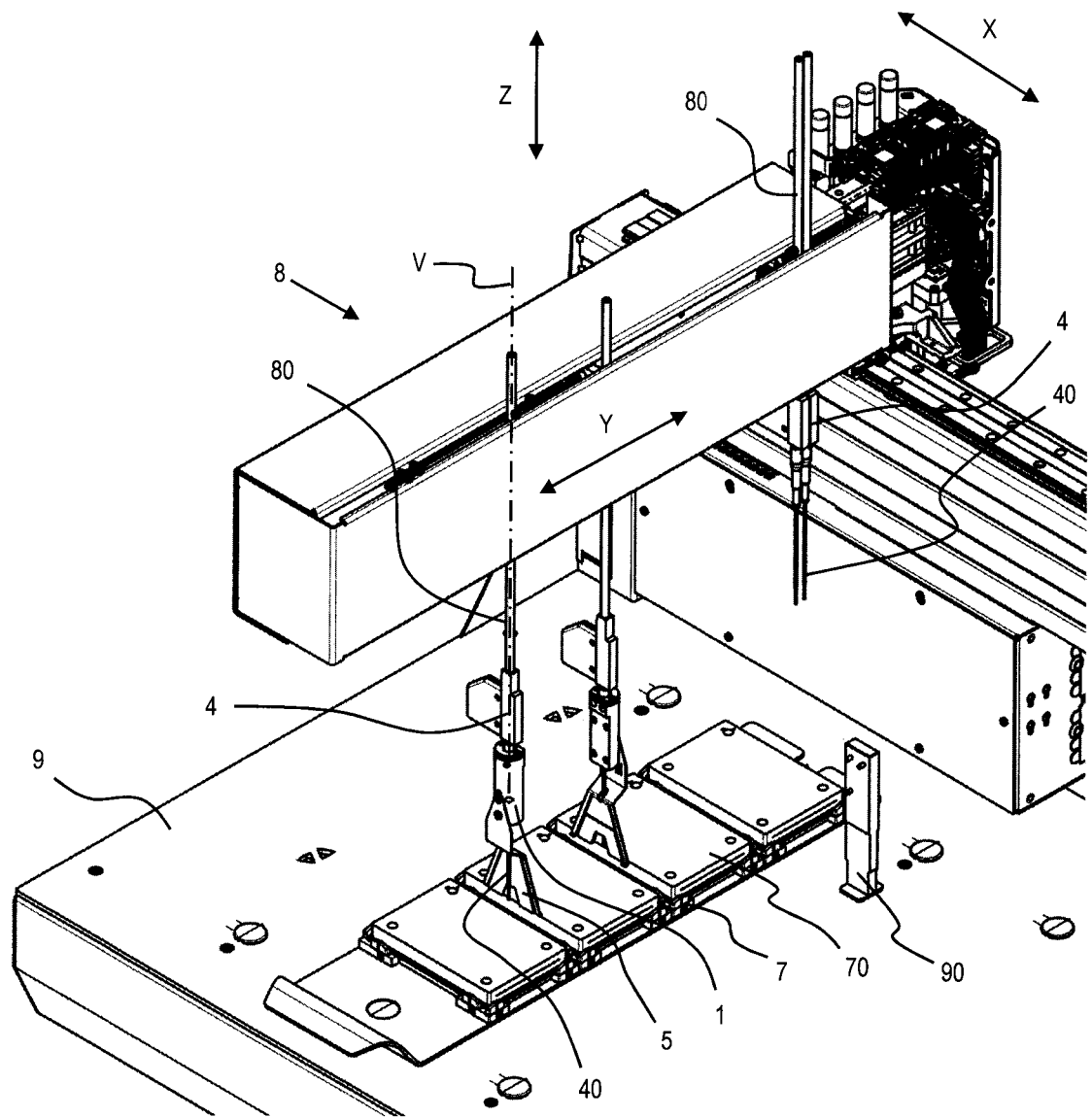
FIG. 1 shows a perspective partial view of a pipetting system according to the invention.

FIG. 1 shows a perspective partial view of a pipetting system according to the invention. The depicted pipetting system comprises four pipette tip receptacles 4, wherein respectively one pipette tip 40 is arranged in two of the receptacles 4 and wherein respectively one pipette tip 40 and one gripper 1; 5 is arranged in two of the receptacles 4. The pipette tip receptacles 4 are arranged on a manipulator 8 by means of which they can be displaced jointly along a first horizontal axis X and can be displaced separately from one another along a second horizontal axis Y and along a vertical axis Z. The manipulator 8 is configured in such a manner that the pipette tip receptacles 4 can be moved over a work table 9. Plate holders 7 for microplates 70 are arranged on the work table 9. A holder 90 for receiving two grippers is also arranged on the work table 9. If the grippers are located in the gripper holder, respectively one pipette tip receptacle 4 can be moved perpendicularly via the coupling 1 of the corresponding gripper. If the pipette tip receptacle 4 is introduced into the coupling 1, it is clamped laterally and a non-positive connection is formed.

Alternatively, a positive connection can be realized. The insertion can be made without removing the pipette tip 40. As a result of a displacement of the pipette tip receptacle 4 along the Y axis, the coupling 1 can be moved out from the laterally arranged pins 91 of the holder 90. Two grippers together can remove a microplate 7 from the plate holder 7 and place it precisely elsewhere. If the grippers are no longer required, they can be arranged in the holder 90 again. In order to avoid an undesired lateral slippage of the gripper from the gripper holder 90, both are magnetic or magnetizable and at least one of the two elements comprise a permanent magnet. In the depicted embodiment the same elements are provided with the same reference numbers.

Figure 2A:
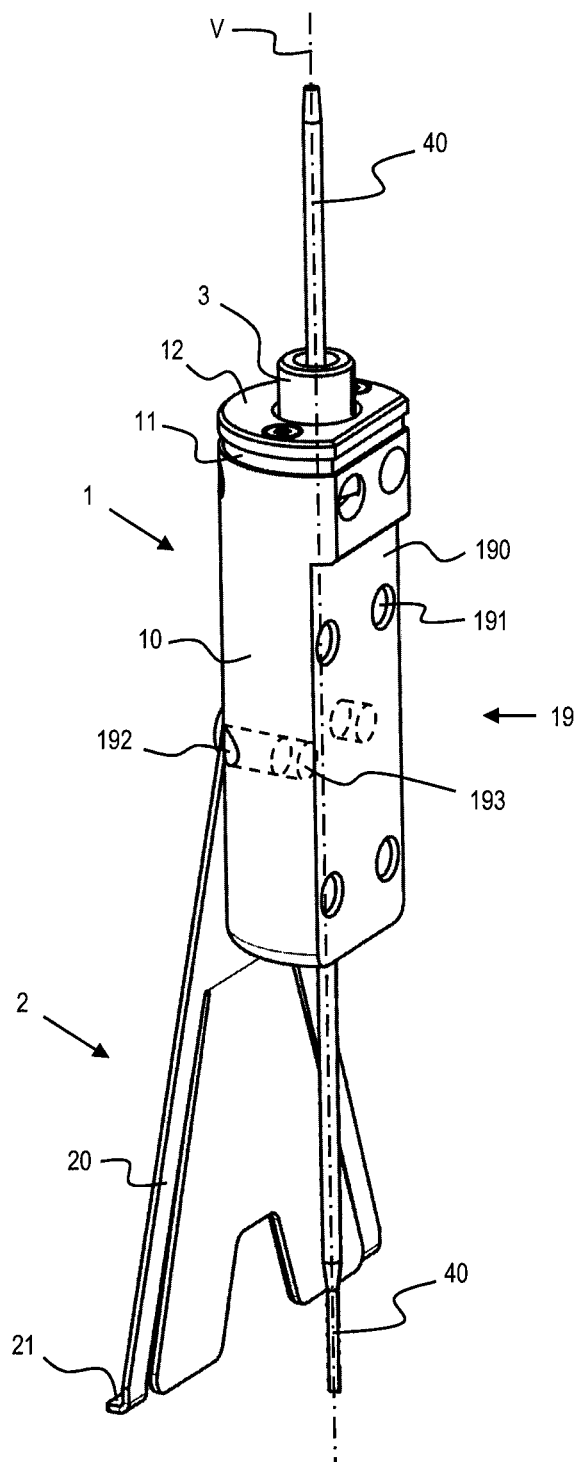
FIGS. 2A and 2B show perspective views of an embodiment of a gripper according to the invention.
Figure 2B:
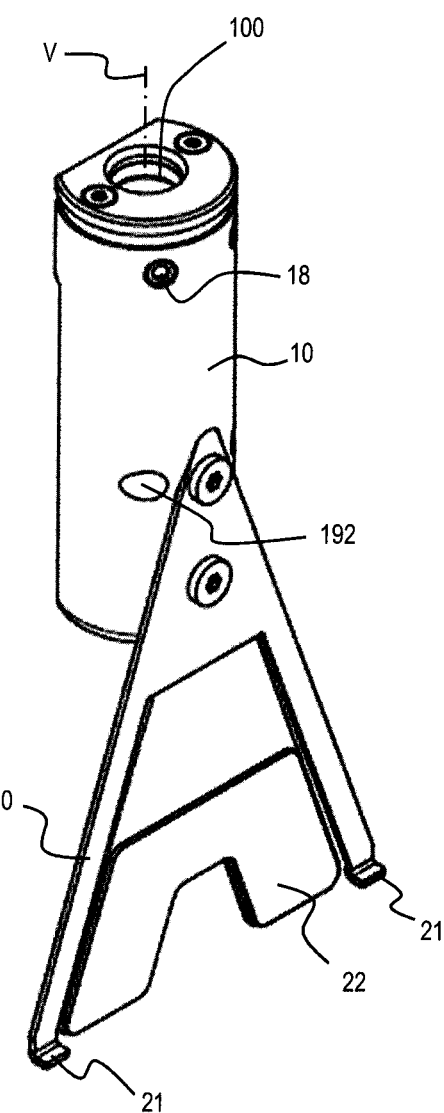

FIGS. 2A and 2B show perspective views of one embodiment of a gripper according to the invention, wherein FIG. 2A shows the gripper with a coupling 1 and a first grip element 2, wherein the coupling 1 is arranged on an adapter 3 with a pipette tip 40 inserted therein. FIG. 2B shows the same embodiment of the gripper from a side opposite the first side but without adapter and pipette tip. In FIG. 2A it can be seen that the pipette tip 40 projects through the entire adapter 3, the entire coupling 1 and via a lower end face of the coupling 1. A first grip element 2 is fastened laterally on a body 10 of the coupling 1. Specifically the first grip element 2 is screwed tightly by means of screws on the body 10. The first grip element 2 comprises a vertical portion 20 and a horizontal portion 21. The grip element 2 is fastened with the vertical portion 20 on the coupling 1. The horizontal portion 21 extends away from the pipette tip 40. The grip element 2 projects downwards beyond the pipette tip 40. The grip element 2 is designed to be narrow in the upper near-coupling region and broadens towards the bottom towards the horizontal portion 21, with the result that a substantially triangular shape of the vertical portion 20 is obtained. The horizontal portion 21 comprises two horizontal tabs which are each arranged in a lateral edge region of the vertical portion 20, i.e. are formed in the lateral corner regions of the triangle in one piece with the vertical portion 20. The first grip element 2 is, for example, made of metal, such as for example, stainless steel or aluminium or of plastic such as for example PEEK (polyether etherketone). A damping element 22, for example, made of a foam mat, is formed between the two tabs 21 on the vertical portion 20. At the upper free end of the coupling 1 a first force disk 1 is then arranged on the body 10, which disk is held clampably between the body 10 and an axial guide ring 12. In the depicted embodiment, screws are used to produce the clamping effect. A through channel 100 extends from the upper free end of the coupling or the axial guide ring 12 along a vertical axis V over the entire length of the coupling 1. An adapter 3 with a pipette tip 40 inserted therein can be inserted from above along the vertical axis V into the through channel 100. The first force disk 11 is made of an elastic material, for example, of an elastic plastic such as for example, rubber or silicone. With the force disk the gripper can be centred, clamped and aligned on the adapter 3. Additionally, the gap between the coupling 1 and the adapter 3 can be sealed thereby. The body 10 of the coupling 1 can be made of metal such as, for example, stainless steel or aluminium or it can be made of plastic such as, for example, PEEK (polyether etherketone). A holding device 19 is formed on one side of the body 10 of the coupling 1 which lies opposite the fastening side of the first grip element 2. The holding device 19 comprises a recess 190 in which position bores 191 are provided. Four position bores 191 which are arranged in a rectangle are shown, wherein two of the holes are arranged in an upper region of the recess 190 and two in a lower region. Magnet bores 192 project from the fastening side into the body 10, extend substantially perpendicular to a surface of the recess 190 and end inside the body 10 before reaching the surface of the recess 190. The magnet bores 192 are arranged in a plane which lies between the upper and lower position bores 191 of the holding device 19. Cylindrical permanent magnets 193 are arranged in the magnet bores 191. FIG. 3 shows a sectional view of a further embodiment of a gripper 1,2 according to the invention, wherein an adapter 40 with a pipette tip 40 inserted therein is arranged in the through channel 100. The adapter 3 is arranged on a tubular Z rod 80, i.e. is screwed to it. The adapter 3 comprises a through channel 34 which extends along the vertical axis V from the upper free end over the entire length of the adapter 3. The through channel 34 comprises a first portion with a thread 36 having a first diameter, wherein the first portion extends from an upper front side of the adapter 3 along the vertical axis V downwards. A second portion having a smaller diameter is configured to adjoin the first portion. A third portion having a smaller diameter is configured to adjoin the second portion, with the result that a circumferential shoulder 35 is obtained on which a circumferential collar 41 of a pipette tip 4 is arranged. In the region of the lower front side of the adapter 3 a first seal 13 is provided in the through channel 34. Specifically, an O-ring 13 is arranged in a circumferential groove in the shaft body 30 of the adapter. The O ring 13 centres the pipette tip 40 in the through channel 34 of the adapter 3 and thus in the through channel 100 of the coupling 1.

The adapter 3 comprises at its free upper end a peripheral entrainment profile 37 on which a tool can be placed in order to screw the adapter 3 with the thread of the Z rod 80. The adapter 3 comprises on its outer side a circumferential groove 33 which is provided adjacent to the entrainment profile. An elastic coupling element 17 of the coupling 1 engages in the assembled state in the circumferential groove 33 of the adapter 3, with the result that positive and non-positive connection can be achieved. In this embodiment a grip element 2 is provided which comprises a vertical portion 20 and an adjoining horizontal portion 21, wherein the horizontal portion 21 is directed towards the pipette tip 40. The vertical portion 20 extends substantially beyond the lower tip of the pipette tip 40. The vertical spacing between the pipette tip 40 and the horizontal portion 21 is dimensioned in such a manner that during gripping of the corresponding laboratory article, for example, a microplate, it cannot collide with the pipette tip 40. A laboratory article to be gripped can accordingly be laterally clamped with a grip element 2, as shown in FIGS. 2A, 2B and 3 and/or the laboratory article can be held with this grip element 2 from below.

FIG. 4 shows a sectional view of a further embodiment of a gripper 1,5 according to the invention. In this embodiment a grip element 5 is provided which comprises a vertical portion 50 by means of which the grip element 5 is screwed tightly on the body 10 of the coupling 1. The horizontal portion 51 is arranged somewhat below the pipette tip 40 and extends away from it. Adjoining the vertical portion 50 there is provided a horizontal further portion 52 and a vertical further portion 53 adjoining it, which is connected to the horizontal portion 51. The further horizontal portion 52 extends from the vertical portion 50 in the direction of the pipette tip 40, but ends at a distance from it. The further vertical portion 53 extends parallel to the pipette tip 40 at a distance from it. All the portions 50, 51, 52, 53 are formed jointly in one piece from a metal sheet.

Figure 5:
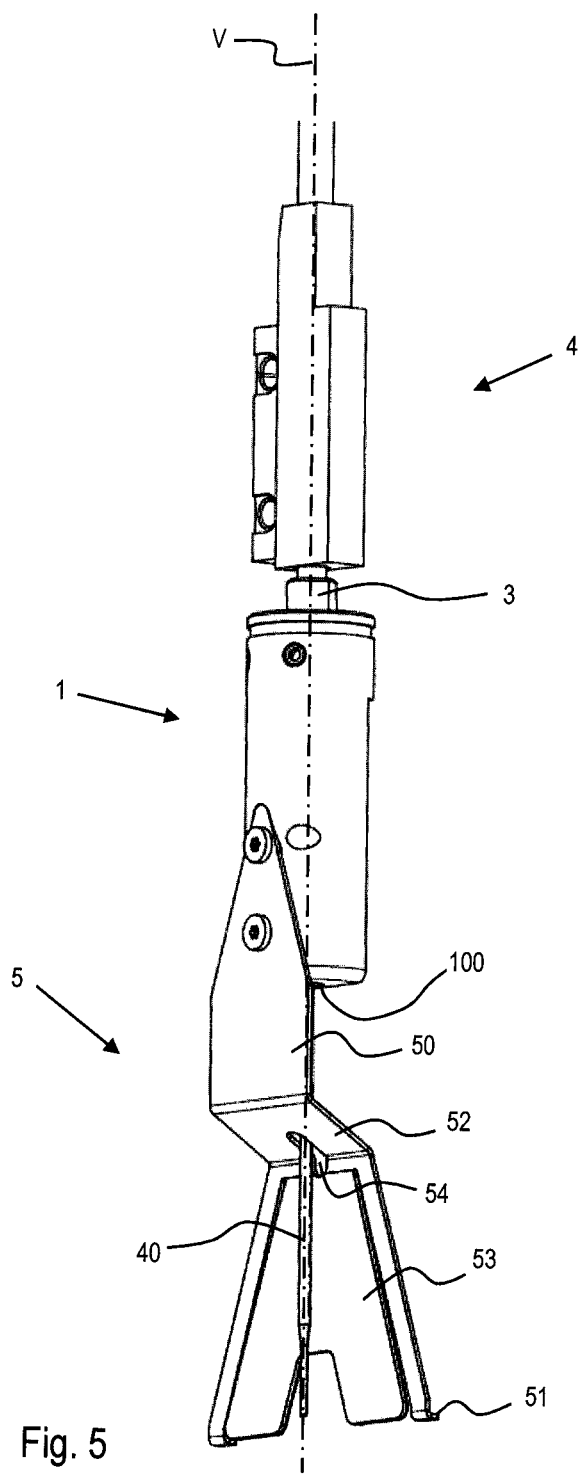
FIG. 5 shows a perspective view of a further embodiment of a gripper according to the invention.

FIG. 5 shows a perspective view of a further embodiment of a gripper 1, 5 according to the invention. In this embodiment a further substantially horizontal portion 52 and a further substantially vertical portion 53 are provided between the vertical portion 50 and the horizontal portion 51 of the grip element 5. The further horizontal portion 52 extends out from the vertical portion 50 in the direction of the pipette tip 40 and beyond it onto the opposite side of the pipette tip 40. The further vertical portion 53 extends substantially parallel to the pipette tip 40 at a distance from it on the opposite side of the vertical portion 50. The horizontal portion 51 extends away from the pipette tip 40. In the further portions 52, 53 a common through opening 54 is provided through which the pipette tip 40 can pass unhindered. The through opening 54 is arranged in the alignment of the through channel 100. A laboratory article to be gripped can accordingly be clamped laterally with a grip element 5, as shown in FIGS. 4 and 5, and/or the laboratory article can be held from below with this grip element 5.

Figure 6:
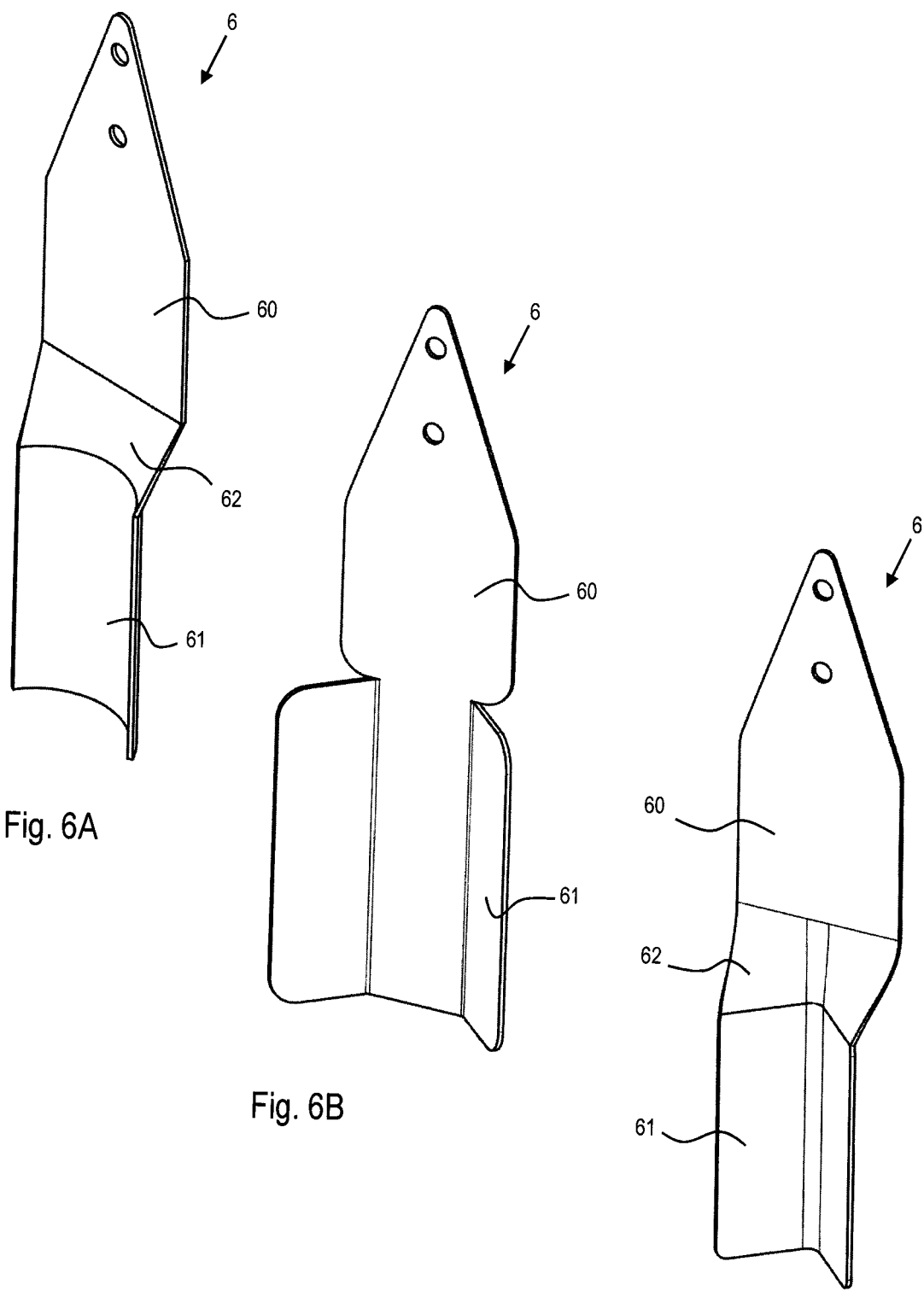
FIGS. 6A, 6B and 6C show perspective views of a further embodiment of grip elements according to the invention.

FIGS. 6A, 6B and 6C show perspective views of further embodiments of grip elements 6 according to the invention. These grip elements 6 all comprise a vertical portion 60 and a further vertical portion 61, wherein each of the further vertical portions 61 comprises regions which lie neither in the plane of the vertical portion 60 nor are parallel to it. That is, these regions lie in vertical planes which are aligned at an angle to the plane of the vertical portion 60. In the embodiment of FIG. 6A, a further angular portion 62 is provided between the vertical portion 60 and the further vertical portion 61. The further vertical portion 61 is configured to be curved. That is, it has the form of a tubular segment section. In the embodiment of FIG. 6B, the further vertical portion 61 comprises two tabs which extend at an angle from the vertical portion laterally away from it. In the embodiment of FIG. 6C a further angularly curved portion 62 is provided between the vertical portion 60 and the further vertical portion 61. The further vertical portion 61 comprises two planes at an angle to one another, which are connected to one another and together have a V-shaped cross-section. In all the embodiments of FIGS. 6A-6C the portions 60, 61, 62 are formed jointly in one piece with one another. For example, tubular laboratory articles such as sample tubes can be gripped with such grip elements. Although not shown, further horizontal portions can be provided on the further vertical portions 61 which are movable under a region of the laboratory article to be gripped in order to grip or hold the laboratory article from below. A laboratory article to be gripped can accordingly be clamped laterally with such a grip element 6 and/or the laboratory article can be held from below with this grip element 6.

Figure 7:
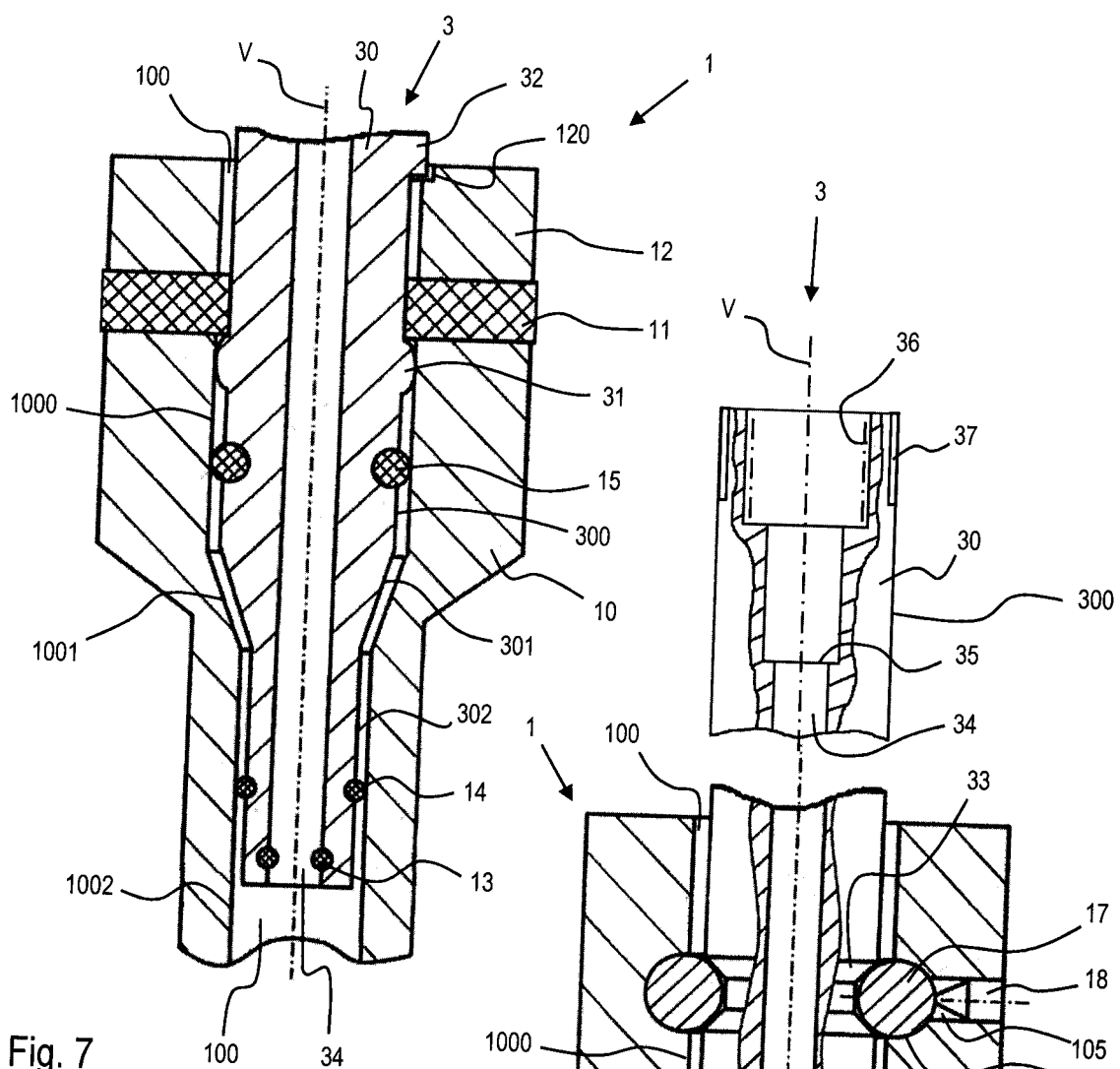
FIG. 7 shows a schematic partial sectional view through an embodiment of an adapter and a coupling.

FIG. 7 shows a schematic partial sectional view through an embodiment of a coupling 1 and an adapter 3. The coupling 1 extends along the vertical axis V. A shaft 30 of the adapter 3 is arranged centrally in the through channel 100 of the coupling 1. The through channel 100 and the shaft 30 comprise an upper cylindrical first region 1000; 300, a second region 1001; 301 which adjoins it underneath and converges conically downwards and a cylindrical third region 1002; 320 which adjoins it underneath. An air gap is provided between the inner walls of the through channel 100 and the outer walls of the shaft 30. In the third region of the shaft 30 a circumferential groove is provided in which an annular second seal 14 is arranged. In the first region of the shaft 30 a circumferential groove is provided in which an annular third seal 15 is arranged. The second seal 14 and the third seal 15 seal the air gap between the coupling 1 and the adapter 3. In addition, a centring, a sealing effect and a fixing can be achieved by this. The cross-sectional diameter of the third seal 15 is larger than that of the second seal 14. In the first region 300 of the shaft 30 a circumferential first elevation 31 is provided which projects radially over the circumference of the cylindrical first region. The radial outer contour of the first elevation 31 is smaller than the inside diameter of the through channel 100. The first force disk 11 has the form of an annular disk whose inside diameter in the braced state is smaller than the inside diameter of the through channel 100. In the assembled state the inner side of the first force disk 11 can contact the outer side of the first region of the adapter 3 whereby a centring, sealing and fixing can be achieved. The first force disk 11 is then arranged in assembly above the first elevation 31 and forms a retaining element for the coupling. By means of this configuration the gripper can be removed from the adapter 3 with a reasonable expenditure of force. In the first shaft region of the adapter 3 a radially outwardly extending second elevation 32 is provided which during assembly can engage in a second recess 120 of the coupling 1 which extends radially outwards from the through channel 100 with the result that a relative rotation between the coupling and the adapter can be prevented.

Figure 8:
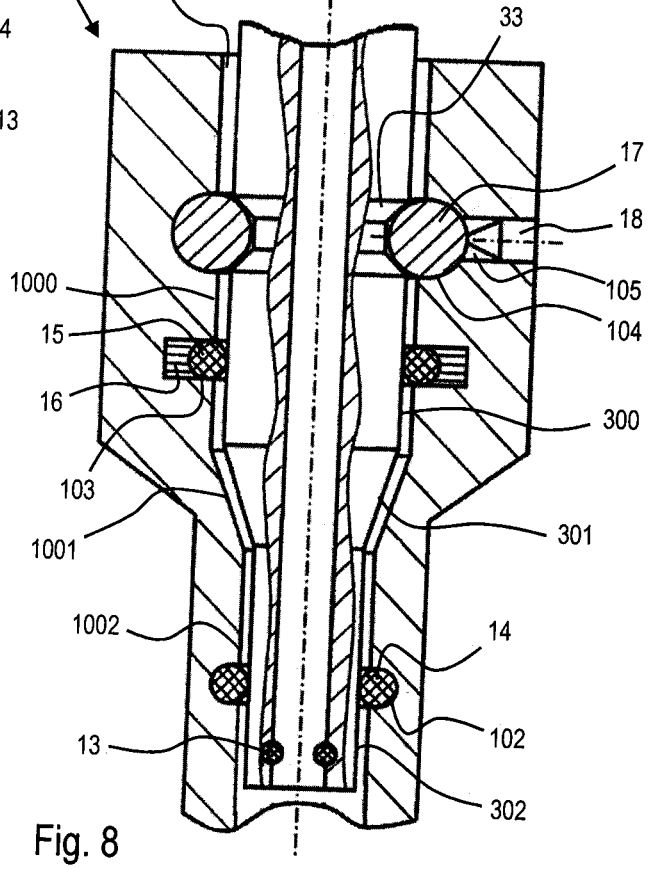
FIG. 8 shows a schematic partial sectional view through a further embodiment of an adapter and a coupling.

FIG. 8 shows a schematic partial section view through a further embodiment of an adapter 3 and a coupling 1. Unlike the first embodiment, in this embodiment in the third region 1002 of the through channel 100 there is provided a circumferential second groove 102 in which an annular second seal 14 is arranged. In the first region 1000 of the through channel 100 a circumferential third groove 103 is provided in which a third seal 15 and a second force disk 16 are arranged, wherein the force disk 16 can apply a radially inwardly directed force component to the third seal 15. The second seal 14 and the third seal 15 seal the air gap between the coupling 1 and the adapter 3. In the first region 1000 of the through channel 100 a circumferential fourth groove 104 is provided in which a toroidal coupling element 17 is arranged. The inside diameter of the coupling element 17 projects into the diameter of the through channel 100. In the first region 300 of the shaft 30 of the adapter 3 a circumferential groove 33 is provided in which the coupling element 17 can engage in the assembled state. As a result of this configuration, the gripper can be removed from the adapter 3 with a reasonable expenditure of force. In the region of the fourth groove 104 in the body 10 of the coupling 1 an outwardly extending radial bore 105 is provided in which a pusher 18 is arranged. With the pusher 18 a radially inwardly directed force can be applied to the coupling element 17 whereby the clamping force of the coupling element 17 can be adjusted.

Naturally, the elements of the first embodiment can be combined with those of the second embodiment. All the resulting embodiments can be used together with the different designs of the grip elements.

Figure 9:
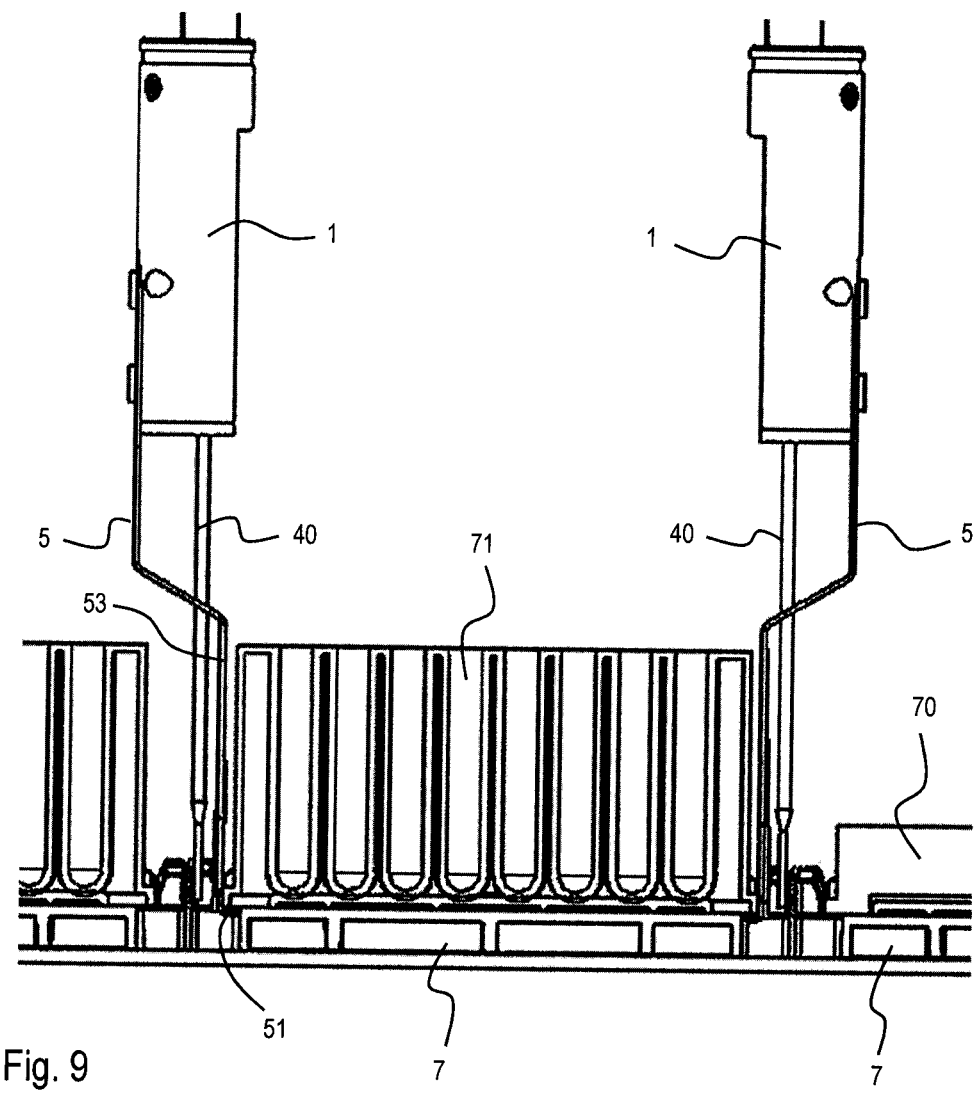
FIG. 9 shows a side view of a pipetting system according to the invention with two grippers which are arranged on two opposing sides of a deep well plate.

FIG. 9 shows a side view of a pipetting system according to the invention with two grippers which are arranged on two opposite sides of a deep well plate 71. In the depicted embodiment, microplates 70 and deep well plates 71 are arranged on plate holders 7 in such a manner that as many plates 70, 71 as possible can be arranged on the available space. Accordingly, the distance between two adjacent plates 70, 71 should be kept as small as possible.

Consequently, the distance between the pipette tip 40 and the receiving location of the plates on the grip element 5 should be kept as small as possible. The distance between the pipette tip 40 and the grip element 5 can, for example, be 0.5 to 10 millimetres, 1 to 8 millimetres or 2 to 5 millimetres. Shown is a deep well plate 71 which is gripped by two grippers shown in FIG. 5 from two opposite sides. For this, the horizontal portions 51 of the respective grip element 5 are moved from the side under the deep well plate 71. The vertical portion 53 adjoining the horizontal portion 53 can press laterally on the plate 71, can rest on it free from pressure or can be arranged at a distance therefrom.

REFERENCE SIGNS LIST

| | |
|---|---|
| 1 | Coupling |
| 10 | Body |
| 100 | Through channel |
| 1000 | First portion |
| 1001 | Second portion |
| 1002 | Third portion |
| 101 | First groove |
| 102 | Second groove |
| 103 | Third groove |
| 104 | Fourth groove |
| 105 | Radial bore |
| 11 | First force disk |
| 12 | Axial guide ring |
| 120 | Second recess |

-continued

REFERENCE SIGNS LIST

| | |
|---|---|
| 13 | First seal |
| 14 | Second seal |
| 15 | Third seal |
| 16 | Second force disk |
| 17 | Coupling element |
| 18 | Pusher |
| 19 | Holding device |
| 190 | Recess |
| 191 | Position bore |
| 192 | Magnet bore |
| 193 | Magnet |
| 2 | First grip element |
| 20 | Vertical portion |
| 21 | Horizontal portion |
| 22 | Damping element |
| 3 | Adapter |
| 30 | Shaft |
| 300 | First portion |
| 301 | Second portion |
| 302 | Third portion |
| 31 | First elevation |
| 32 | Second elevation |
| 33 | Groove |
| 34 | Through channel |
| 35 | Shoulder |
| 36 | Thread |
| 37 | Entrainment profile |
| 4 | Pipette tip receptacle |
| 40 | Pipette tip |
| 41 | Collar |
| 5 | Second grip element |
| 50 | Vertical portion |
| 51 | Horizontal portion |
| 52 | Further portion |
| 53 | Further portion |
| 54 | Through opening |
| 6 | Third grip element |
| 60 | Vertical portion |
| 61 | Vertical portion |
| 62 | Further portion |
| 7 | Plate holder |
| 70 | Microplate |
| 71 | Deep well plate |
| 8 | Manipulator |
| 80 | Z rod |
| 9 | Work table |
| 90 | Holder |
| 91 | Pin |
| V | Vertical axis |
| X | First horizontal axis |
| Y | Second horizontal axis |
| Z | Vertical axis |

The invention claimed is:

1. A pipetting system comprising:
    at least one pipette tip receptacle (4) with a pipette tip (40) arranged therein, which extends along a vertical axis (V),
    at least one gripper (1,2;5;6) comprising:
        a mechanical coupling (1) which extends along the vertical axis (V), wherein the gripper is coupled to the at least one pipette tip receptacle (4) with the coupling (1) and
        at least one grip element (2;5;6) which extends from the coupling (1) along the vertical axis (V), wherein the at least one grip element (2;5;6) comprises at least one vertical portion (20;50;60),
    characterized in that the coupling (1) comprises a body (10) having a through channel (100) which extends along the vertical axis (V) over the entire length of the coupling (1) and wherein the pipette tip (40) extends along the through channel (100) of the coupling (1), at least partially.

2. The pipetting system according to claim 1, wherein the grip element (2;5;6) is arranged laterally on the body (10) of the coupling (1).

3. The pipetting system according to claim 1, wherein a first force disk (11) is arranged clampably between the body (10) and an axial guide ring (12) at the upper free end of the coupling (1), wherein in the clamped state, the inner contour of the first force disk (11) projects into the interior of the contour of the through channel (100).

4. The pipetting system according to claim 1, wherein the pipette tip receptacle (4) comprises an adapter (3) with a through channel (34), which extends along the vertical axis (V) over the entire length of the adapter (3), wherein the pipette tip (40) extends at least partially along the through channel (34) of the adapter (3).

5. The pipetting system according to claim 4, wherein the through channel (34) of the adapter (3) comprises a first portion with a thread (36) having a first diameter, wherein the first portion extends from an upper front side of the adapter (3) along the vertical axis (V) downwards, comprises a second portion adjoining the first portion having a second diameter, wherein the second diameter is configured to be smaller than the first diameter, and comprises a third portion adjoining the second portion having a third diameter, wherein the third diameter is smaller than the second diameter, whereby a circumferential shoulder (35) is obtained on which the pipette tip (4) is arranged.

6. The pipetting system according to claim 4, wherein the adapter (3) comprises a shaft (30) having a cylindrical first portion (300), a conical second portion (301) and a cylindrical third portion (302).

7. The pipetting system according to claim 6, wherein in the first portion (300) of the adapter (3) a circumferential first elevation (31) is provided, the outer contour of which projects outwards over the contour of the first portion (300), wherein the outer contour of the first elevation (31) lies inside the contour of the through channel (100) of the coupling (1).

8. The pipetting system according to claim 6, wherein in the first portion (300) of the adapter (3) a radially outwardly extending second elevation (32) is provided, wherein at the upper free end of the coupling (1) at least one second recess (120) is provided, which extends radially outwards from the through channel (100) and wherein the second elevation (32) of the adapter (3) can be received in the second recess (120) of the coupling (1), with the result that a relative twisting of the gripper (1,2;5) relative to the adapter (3) can be prevented.

9. The pipetting system according to claim 6, wherein in the through channel (34) of the adapter (3) in the region of the lower free end of the adapter (3) a first seal (13) is provided, which prevents any direct contact of the pipette tip (40) with the through channel (34) of the adapter (3).

10. The pipetting system according to claim 6, wherein in the first portion (300) of the adapter (3) on the outer side thereof a circumferential groove (33) is provided, wherein in a first portion (1000) of the through channel (100) a circumferential fourth groove (104) is provided, and wherein an annular elastic coupling element (17) is provided, which engages in both grooves (33;104).

11. The pipetting system according to claim 10, wherein in the coupling (1) at least one radial bore (105) is provided, which extends radially outwards from the fourth groove (104) and in which a pusher (18) is arranged, by means of which a radially inwardly directed force can be applied to the coupling element (17).

12. The pipetting system according to claim 1, wherein the at least one grip element (2;5) comprises at least one horizontal portion (21;51).

13. The pipetting system according to claim 12, wherein the horizontal portion (21;51) of the grip element (2;5) extends away from the pipette tip (40).

14. The pipetting system according to claim 12, wherein the at least one grip element (5;6) comprises further portions (52,53;62) which are arranged between the vertical portion (50) and the horizontal portion (51) or which are arranged between the vertical portion (60) and the further vertical portion (61).

15. The pipetting system according to claim 12, wherein at least one of the further portions (52,53) comprises a through opening (54) which is arranged in the extension of the through channel (100).

16. The pipetting system according to claim 15, wherein two, more, or all the portions (52,53) comprise a separate through opening (54) or wherein two, more, or all the portions (52,53) comprise a common through opening (54).

17. The pipetting system according to claim 1, wherein the at least one grip element (6) comprises a further vertical portion (61).

18. The pipetting system according to claim 1, wherein the pipetting system further comprises a manipulator (8), by means of which the at least one pipette tip receptacle (4) can be moved along a first horizontal axis (X), along a second horizontal axis (Y) perpendicular to the first horizontal axis (X) and along a vertical axis (Z) perpendicular to the two horizontal axes (X;Y).

19. The pipetting system according to claim 1, wherein the pipetting system further comprises at least one holder (90) for the at least one gripper (1,2;5).

20. A method for use of a gripper in a pipetting system according to claim 1, comprising the steps:
providing at least one pipette tip receptacle (4) with a pipette tip (40) arranged therein;
providing at least one gripper (1,2;5;6) with a through channel (100);
arranging the pipette tip receptacle (4) over the gripper (1,2;5;6);
lowering the pipette tip receptacle (4) with the result that the pipette tip (40) is introduced into the through channel (100); and
producing a connection between the pipette tip receptacle (4) and the gripper (1,2;5;6).

* * * * *